United States Patent Office 3,063,825
Patented Nov. 13, 1962

3,063,825
CONTROLLING PLANT GROWTH WITH
OCTACHLOROPROPANE
Edward D. Weil, Lewiston, N.Y., assignor to Hooker Chemical Corporation, Niagara Falls, N.Y., a corporation of New York
No Drawing. Filed Jan. 24, 1961, Ser. No. 84,514
8 Claims. (Cl. 71—2.7)

This invention describes an organic herbicide especially effective for the control of weeds and undesirable vegetation. More specifically, this invention relates to an organic fumigant, octachloropropane possessing marked phytotoxic properties particularly against subsurface plant organs, aquatic weeds and the dormant seeds of plants generally.

While the eradication of weeds and undesirable vegetation is very old, and the number of herbicides suggested and used extensive, surprisingly little progress has been made against those plants and aquatic weeds having a substantial portion of the plant below the surface of the ground or water. Also, little progress has been made in killing seeds before they germinate. The reasons for this are several. Among them is the fact that many weeds or undesirable plants have substantial portions of their parts below the surface of the soil or water as rhizomes, tubers or roots and store a sizable reserve of food there. Thus, when the above surface portion of the plant is killed, this sub-soil reserve enables the plant to rejuvenate readily. Weed seeds may remain viable in the soil for many years and cause re-infestation. Another problem is that many otherwise satisfactory herbicidal fumigants such as methyl bromide, ethylene oxide and formaldehyde require a surface cover such as tarpaulin to be effective. This is inconvenient in the case of weeds growing in the soil and impossible in the case of aquatic weeds. Furthermore, many of these fumigants and herbicides generally are rather quickly dissipated or leached out of the soil by moisture, thus making them ineffective against dormant seeds of the weeds or aquatic weeds in their environment. An additional disadvantage of most of the known effective herbicides is the high rate of application required to function effectively. This, of course, is a deterrent to the widespread use of these phytotoxic materials where the area to be treated is large and the resulting expense great, or where the economy is substandard and cost is paramount. For example, in many navigable streams, rivers and canals, aquatic weeds are capable of curtailing navigation especially where climatic conditions are favorable for vigorous plant growth. In these tropical areas the use of the waterways are sometimes actually halted by this vegetative growth, causing great economic deprivation to the people involved. In most of these areas the economy is substandard, and even an effective herbicide, unless effective at low rates of application, cannot be used, the cost of the program being of primary importance.

The applicant has unexpectedly found that octachloropropane has potent phytotoxic activity against established terrestrial and aquatic weeds, as well as their seeds. This activity is especially remarkable in the light of the lack of activity as herbicides of the closely related polychloroalkanes such as tetrachloromethane, hexachloroethane and hexachloropropane, when these latter compounds are applied under comparable conditions and concentrations. A further advantage to the user is the activity of octachloropropane against these aforementioned weeds over long periods of time.

The product of this invention is a white waxy solid, melting at one hundred and fifty degrees centigrade when pure, and having a penetrating odor reminiscent of moth crystals. It is a well known intermediate and may readily be prepared by the chlorination of propane or propylene mixtures containing propane at subatmospheric pressure. One synthesis among several is described in United States Patent 2,492,941. The compound may be used by itself and has the advantage of compatibility with some of the common more highly volatile fumigants, such as methyl bromide. A further advantage is that the compound of the invention is a solid, unlike the known soil fumigants such as methyl bromide, and being a solid, it may very conveniently be applied by hand, by use of a fertilizer spreader, or by a seed planter. The compound may be prepared as granules or pellets. It may be diluted by admixture with or absorption on, solid diluent such as clay, vermiculite, silica, solid fertilizer, sawdust, or the like. An additional advantage is the stability and solubility of the compound in a variety of common solvents such as petroleum fractions or in most aromatics such as xylene and toluene. Such solutions may be further dispersed in water by the aid of emulsifiers. When the herbicide is formulated as an emulsion, it may be washed down into the soil by applying water, or by carrying out the application immediately before a rainfall. Finally the inventive herbicide of this invention is advantageous in that it may be used in combination with other herbicides such as the chlorinated phenoxy aliphatic acids as exemplified by 2,4-dichlorophenoxyacetic acid.

For aquatic use, the herbicide may be applied using any of the above formulations. Particularly advantageous is an emulsifiable solution of the toxicant in a solvent. This solubility and stability in these solvents allows the use of the herbicide as a spray or drench. The herbicide may be admixed in the soil by itself using tilling, discing or plowing, or it may be mixed by hand or machine by itself. The preferred method is to admix the chemical to a depth to which the subsurface weeds, roots, rhizomes or tubers are known to extend. This will usually be at a depth ranging from a fraction of an inch to one foot, the variation being caused by the difference in growth habits of the plants encountered. Again, for the aforementioned variations of species, the concentration of herbicide ranges between five and one thousand parts per million parts of soil, optimally between twenty and four hundred pounds per acre. Where the inventive herbicide is used to control aquatic weeds, the concentration used is between one and two hundred parts of herbicide to one million parts of water. Smaller amounts have insufficient activity against most weeds, larger amounts are uneconomical for most applications.

The above mentioned properties of the subject product give some indication of the advantages that this herbicide enjoys over that of the prior art. Inter alia the compound is effective at low rates, may be applied by itself as a solid, or in conjunction with liquid or solid carriers or volatile fumigants, requires no cover and is phytotoxic to the sub-level portions of the plant as well as its dormant seeds. In addition, the compound is inexpensive enough to be used in the substandard tropical portions of the world, where aquatic weeds are of extreme economic importance. Other advantages of this herbicide and its salts will suggest themselves upon a further reading of the specification. Actual illustrations of some of the modes of formulating the product as well as the herbicidal results obtained, appear in the examples which follow.

*Example 1*

A liquid formulation of octachloropropane is as follows:

| | Parts by weight |
|---|---|
| Octachloropropane | 5 |
| Xylene | 20 |

The ingredients are stirred together to obtain a clear solution.

Example 2

An emulsifiable liquid formulation is as follows:

| | Parts by weight |
|---|---|
| Octachloropropane | 5 |
| Emulsifier (polyoxyethylene ether-alkylarylsulfonate mixture) | 2 |
| Xylene | 8 |

The ingredients are stirred together to form a clear solution.

Example 3

A solid granular formulation is as follows:

| | Parts by weight |
|---|---|
| Octachloropropane | 1 |
| Vermiculite (20–40 mesh) | 9 |

The octachloropropane is heated with the dried vermiculite in a closed vessel until impregnation of the vermiculite by the octachloropropane has occurred.

Example 4

An area in Niagara County, New York, having a heavy natural infestation of quackgrass, nutgrass, shepard's purse, timothy, mustard, and ragweed was divided into plots. Octachloropropane, sprayed in a formulation such as Example 1, was disced into plots to a six inch depth, using various quantities per acre. Related chemicals were similarly applied. Four months later the plots were inspected.

| Chemical | Rate (Lbs./Acre) | Weed Control,[1] percent |
|---|---|---|
| Octachloropropane | 20 | 25 |
| | 50 | 50–90 |
| | 100 | 90–100 |
| Hexachloropropane | 100 | 0–5 |
| Hexachloroethane | 100 | 0 |
| Tetrachloromethane (carbon tetrachloride) | 100 | 0 |

[1] Relative to untreated check plots.

Example 5

Plots infested with Johnson grass seeds were treated with octachloropropane by admixing the chemical to about six inches in depth with a spade. After several weeks, when the seeds had germinated in an untreated check plot to give a heavy stand of Johnsongrass seedlings, essentially one hundred percent control was observed in plots treated with twenty to one hundred pounds per acre of octachloropropane.

Example 6 (Aquatic)

Octachloropropane was dispersed at five p.p.m. and at one hundred p.p.m. in water at eighty degrees Fahrenheit, wherein were growing five representative aquatic weeds: pithophora, alligator weed, water hyacinth, duckweed, and water star-grass. At one hundred p.p.m., all species were found to be killed when inspected two weeks later. At five p.p.m., duckweed was killed, pithophora and water star-grass nearly all killed, and the others severely injured, and their growth thereby retarded.

I claim:

1. A method for the control of vegetation which comprises treating the subsurface parts of plants with phytotoxic amounts of octachloropropane.

2. A method for the control of aquatic vegetation which comprises applying octachloropropane in phytotoxic amounts to the water medium in which the vegetation is situated.

3. A method for the control of weeds and weed seeds in the soil which comprises the subsurface addition of octachloropropane in phytotoxic amounts to the soil.

4. The method of claim 1 wherein the medium in which the vegetation is situated is earth and the amount of octachloropropane added to the locus is at least five pounds per acre.

5. The method of claim 2 wherein the concentration of octachloropropane present in the water medium is at least one part of herbicide per one million parts of water.

6. A method for controlling undesirable roots, rhizomes, tubers and dormant seeds comprising applying octachloropropane in phytotoxic amount to the sub-surface level locus of the plant to be treated.

7. The method of claim 6 wherein the octachloropropane is applied at the rate of between twenty and four hundred pounds per acre.

8. The method of claim 6 wherein the plant life controlled is dormant seeds and the octachloropropane is applied at a rate of between twenty and four hundred pounds per acre.

References Cited in the file of this patent

UNITED STATES PATENTS

| 2,110,842 | Ressler | Mar. 8, 1938 |
| 2,140,519 | Elston | Dec. 20, 1938 |
| 2,636,815 | Molnar | Apr. 28, 1953 |